United States Patent
Chapman (12)

(10) Patent No.: US 6,185,216 B1
(45) Date of Patent: Feb. 6, 2001

(54) SYNCHRONIZATION IN AN SDH NETWORK

(75) Inventor: Steven T Chapman, Buxton (GB)

(73) Assignee: Marconi Communications Limited (GB)

(*) Notice: Under 35 U.S.C. 154(b), the term of this patent shall be extended for 0 days.

(21) Appl. No.: 08/973,182

(22) PCT Filed: May 31, 1996

(86) PCT No.: PCT/GB96/01300

§ 371 Date: Jan. 9, 1998

§ 102(e) Date: Jan. 9, 1998

(87) PCT Pub. No.: WO96/39760

PCT Pub. Date: Dec. 12, 1996

(30) Foreign Application Priority Data

Jun. 6, 1995 (GB) .................................................. 9511426

(51) Int. Cl.[7] .................................................. H04Q 7/28
(52) U.S. Cl. ........................... 370/402; 370/403; 370/503
(58) Field of Search .................................. 370/503, 16.1, 370/60, 498, 509, 907, 258, 350, 405, 406, 252, 248, 249, 241; 375/354, 376; 359/138, 161, 119

(56) References Cited

U.S. PATENT DOCUMENTS

| | | |
|---|---|---|
| 5,355,362 | 10/1994 | Gorshe et al. . |
| 5,367,395 | * 11/1994 | Yajima et al. ........................ 370/249 |
| 5,473,640 | * 12/1995 | Bortolini et al. ..................... 375/376 |
| 5,682,408 | * 10/1997 | Tanonaka .............................. 375/354 |

FOREIGN PATENT DOCUMENTS

WO 94/11966   5/1994 (WO) .

OTHER PUBLICATIONS

ITU–T Recommendation G.803, Mar. 1993, Geneve, CH, pp. 1–57, XP002010580, NN: "*Architectures of Transport Networks Based on the Synchronous Digital Hierarchy (SDH))*".

GLOBECOM '92; Orlando, U.S., vol. 1, 2, 3, Dec. 6, 1992, Institute of Electrical and Electronics Engineers, pp. 821–828, XP000357679, Crossett, J.A., et al., "*Sonet/SDH Network Synchroization and Synchronization Sources*".

TELCOM Report, vol. 17, No. 3, May 1994, Munchen DE, pp. 115–117, XP000451993, Stummer, B.; Volejnik, W.; "*Taktkonstanz Sichert Ubertragungsqualitat*".

* cited by examiner

Primary Examiner—Wellington Chin
Assistant Examiner—Prenell Jones
(74) Attorney, Agent, or Firm—Kirschstein, et al.

(57) ABSTRACT

An SDH network is enclosed in which the occurrence of closed timing loops is prevented by causing each node to stamp the clock signal passing through that node with identifying data. In one embodiment, each node is operative to overstamp any node identifying data from preceding nodes and to indicate that the timing signal is not to be used for synchronization purposes if the node to which it is being sent would result in a closed timing loop. In a second embodiment, node identifying data is added to a list, and if any node reads its own indenting data on that list, then it knows not to use the synchronization signal. By counting the number of nodes through which the signal has passed, a way is provided for preventing the occurrence of synchronization reference chains of excessive length.

8 Claims, 4 Drawing Sheets

SYNCHRONIZATION IN AN SDH NETWORK

BACKGROUND OF THE INVENTION

This invention relates to an SDH (synchronous digital hierarchy) network. Communication systems using optical networks, and to a lesser extent radio networks are increasingly employing digital communication patterns. The European systems are being standardized by the CCITT on SDH whereas the American systems are known as SONET (synchronous optical networks) and operate on the ANSI standard. The SDH system uses a network-node interface and is compatible with SONET. With the network node system it is necessary to drive information around a network using a clock pulse and this is normally obtained from an external timing source. The invention is applicable to any such system.

Within such a network it is important that the clock pulse used within a node for synchronization purposes is of as high a quality as possible—i.e. that it has not deteriorated to the extent that there is uncertainty in its value. One problem where such deterioration can occur is when a closed timing loop forms such that the same timing signal is sent repeatedly around a loop and where deterioration occurs in the clock signal each time it passes through a node. It is one object of the invention to provide a means for preventing the occurence of such closed timing loops.

SUMMARY OF THE INVENTION

In Globecom '92: Orlando, US, vol. 1-2-3, 6.12.1992, Institute Of Electrical And Electronics Engineers, pages 821–828, J. A. Crossett et al: "SONET/SDH NETWORK SYNCHRONIZATION AND SYNCHRONISATION SOURCES" the clock references for SONET and SDH network synchronization and distribution of these reference signals in the synchronous optical network are addressed. These signals provide transport equipment and office synchronisation. The paper discusses synchronization quality levels found in the network. The synchronization network is presented from a SONET view point with comparisons made to the SDH network. In WO-A-94-11966 is disclosed a hierarchical synchronization method for a telecommunications system employing message-based synchronization and comprising a plurality of nodes interconnected by transmission lines. In the method the nodes interchange signals containing synchronization messages with information on the priority of the respective signal, in the form of node signatures, within the internal synchronization hierarchy of the system. In addition a transmission line between two nodes is monitored to verify its bidirectionality, and as soon as the bidirectionality of the line cannot be verified, the use of the line for synchronization is prohibited.

In one aspect the invention provides a synchronous digital hierarchy (SDH) network comprising a plurality of nodes interconnected by bidirectional links, an external clock signal being present at an input of one of said nodes which are arranged to pass the clock signal from node to node for synchronization, each node comprising means for stamping the clock signal passing through the respective node with data identifying that node as part of a means for preventing the occurrence of closed timing loops. Once ensuing nodes have knowledge of where the clock signal has been, a decision can be made as to whether a closed timing loop would occur.

In one embodiment each node comprises means for replacing any node identifying data from preceding nodes through which the signal has passed.

Such an arrangement provides an effective means, in particular for preventing the occurence of closed timing loops between adjacent nodes.

Preferably in such a case each node comprises means for reading the identity of the node from which an incoming clock signal has arrived and for transmitting, in the event that the clock signal is to be returned to that same node, a signal indicative that the clock signal is not to be used for synchronization.

Within SDH information is carried in a framework comprising 270 bytes of information. These are arranged in columns in nine rows. The first nine columns are used for creating an overhead known as the section overhead (SOH). Synchronization status indication (SSMB) is included as part of the section overhead. The byte of information referred to in a section overhead for synchronization is known as S1 and is used to indicate the quality of the timing source that supports the traffic to which it is attached. In the embodiment described above it is preferably the S1 byte of the SSMB that is adapted to carry the signal indicative data that the clock signal is not to be used.

BRIEF DESCRIPTION OF THE DRAWINGS

The embodiment described above is of particular use in preventing the occurence of timing loops between adjacent nodes within a network. In order to prevent the possibility of larger multi node loops, in an alternative embodiment, each node comprises means for adding node identifying data to a list transmitted along with the clock signal, which list identifies a plurality of preceding, nodes through which the clock signal has passed and means for preventing, in the event that the list contains data identifying the respective node, use by the respective node of the clock signal for synchronization.

In the event that a node finds it own identifying data in the list then the respective node will have detected a timing loop.

It is also desirable that, irrespective of the presence of timing loops, a clock signal does not pass through too many nodes before being discarded. Preferably, with the embodiment described immediately above, each node comprises means for counting the number of nodes through which the clock signal has passed and for preventing, in the event that the number exceeds a predetermined value, use by the respective node of the clock signal for synchronization.

Figure 1:
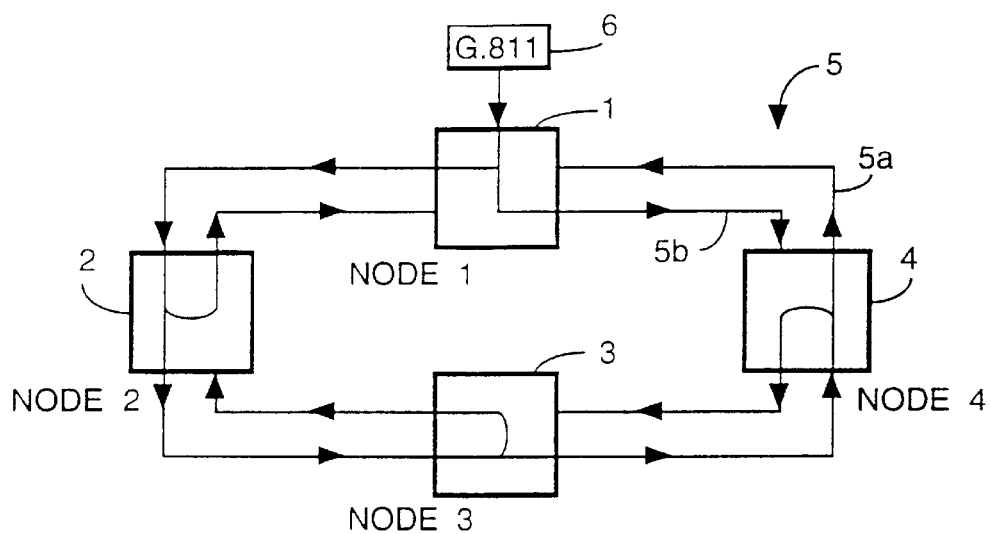
Figure 2:
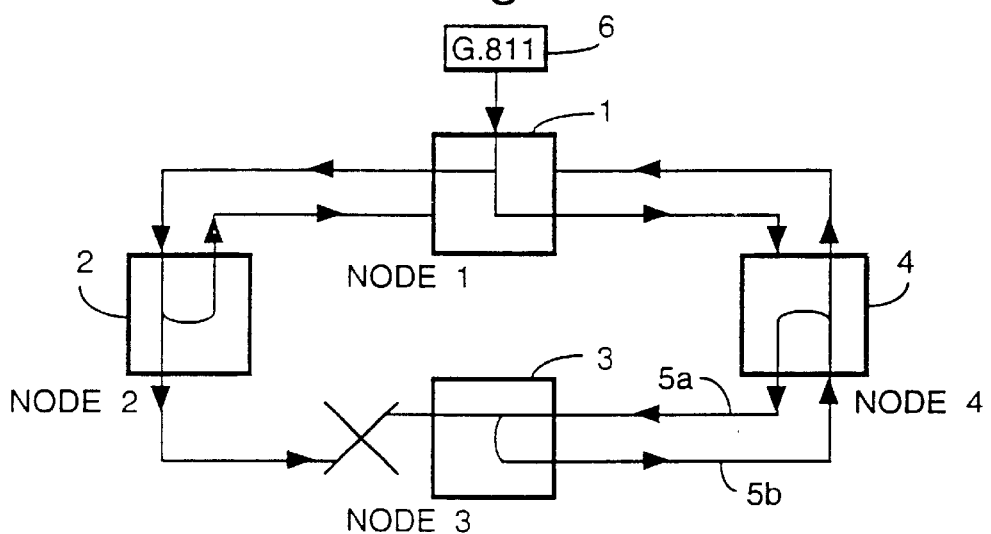
Figure 3:
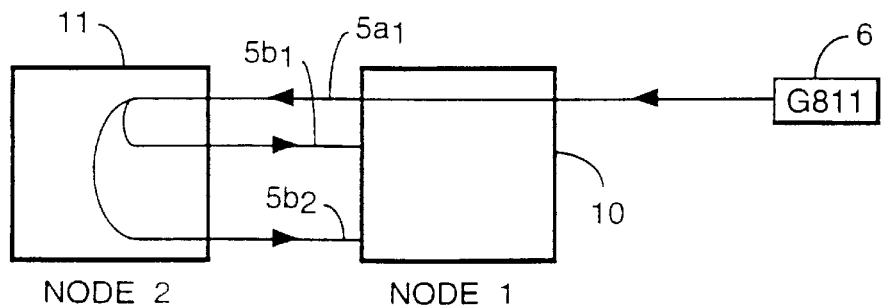
Figure 4:
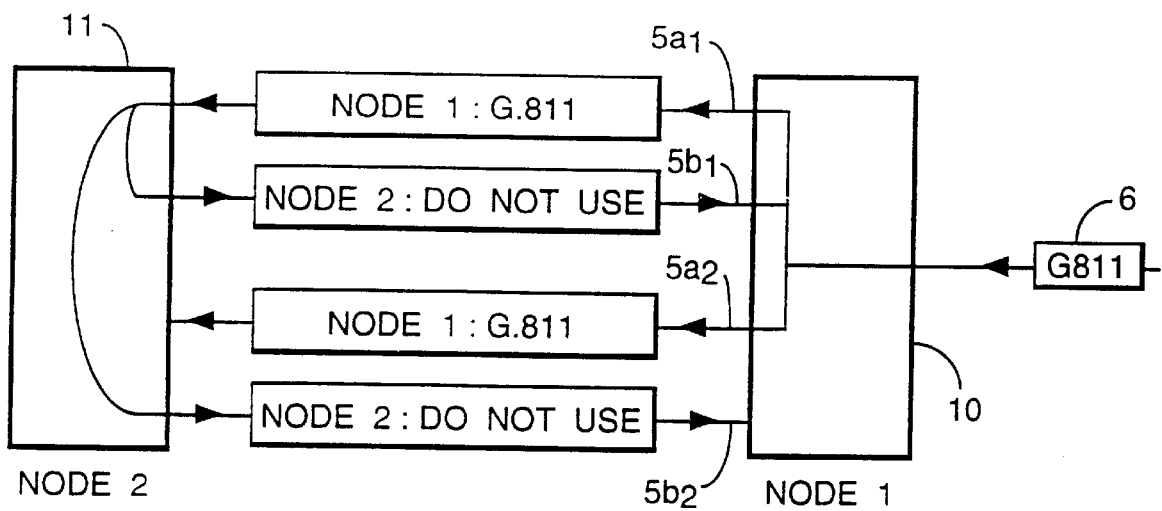
Figure 5:
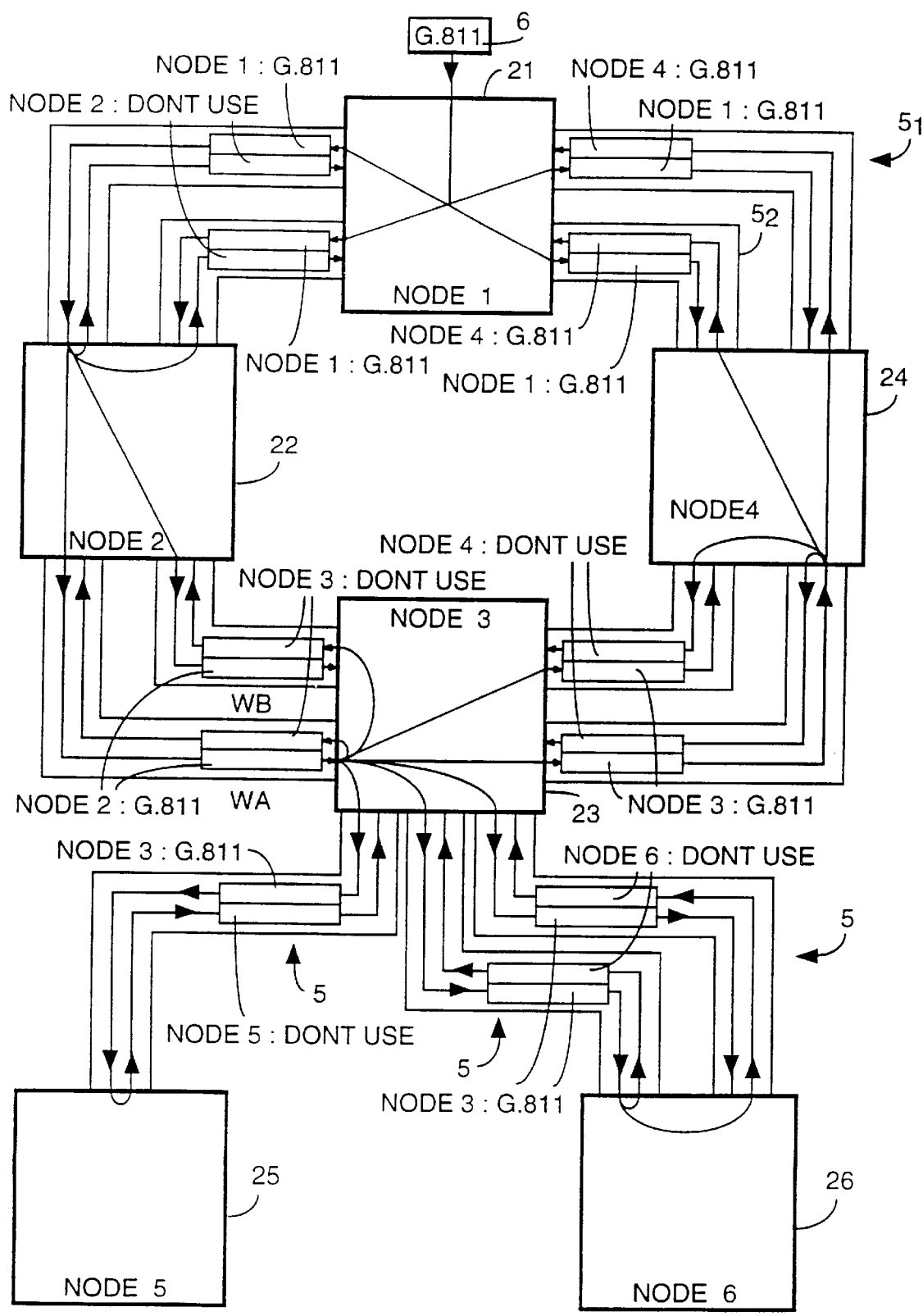
Figure 6:
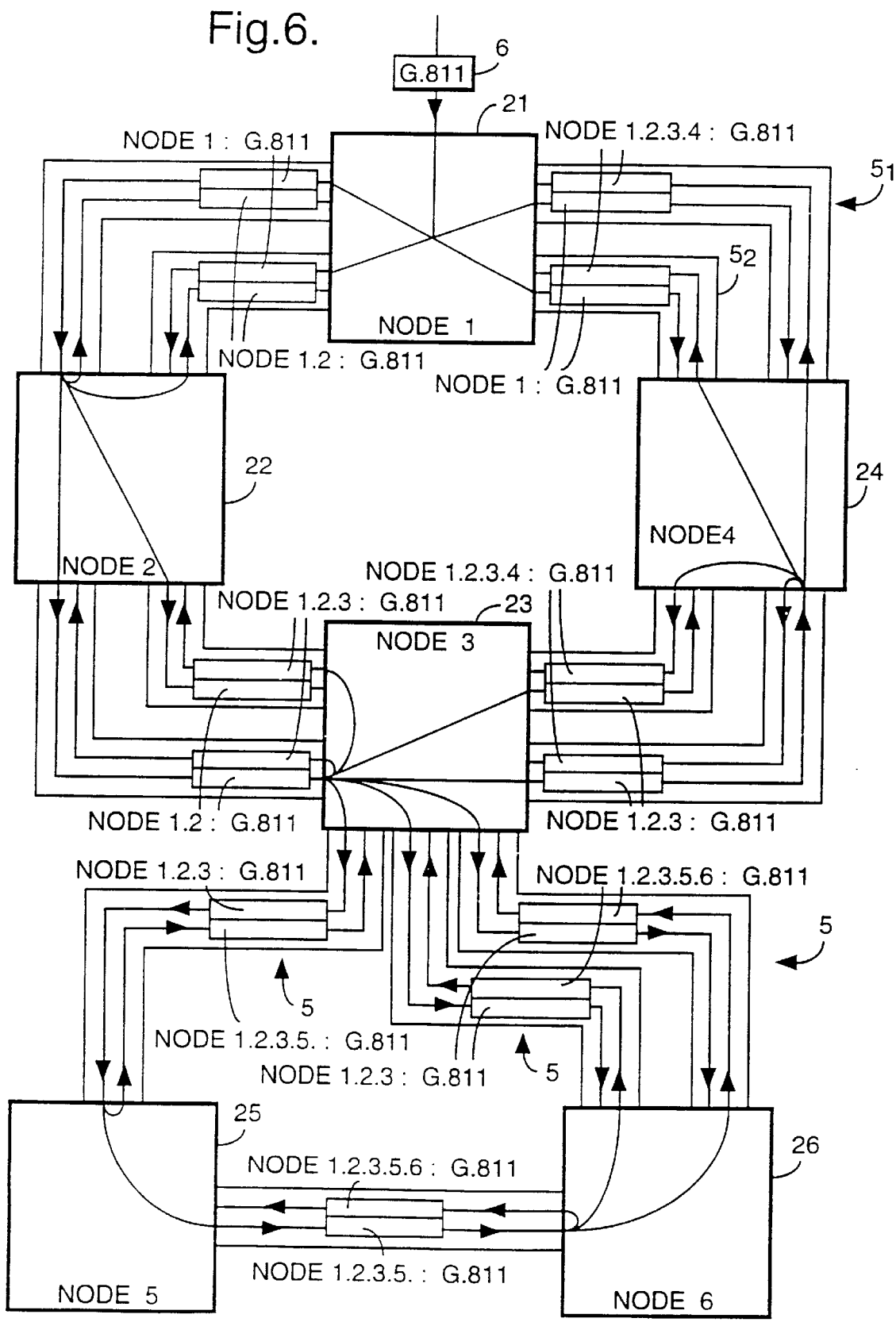

Embodiments of the invention will now be described by way of example with reference to the accompanying drawings in which;

FIG. 1 illustrates schematically an SDH network in the form of a ring;

FIG. 2 illustrates the network of FIG. 1, after a fault condition has developed;

FIG. 3 illustrates a pair of adjacent nodes within an alternative, more complicated type of network;

FIG. 4 illustrates two nodes in operation according to one aspect of the invention;

FIG. 5 illustrates a more complicated multimode network according to the invention; and FIG. 6 illustrates the network of FIG. 5, but which uses a different aspect of the invention.

Referring to FIG. 1 an SDH network comprises four nodes 1, 2, 3, 4 arranged in a ring configuration and where each adjacent node is connected by a bidirectional communication link 5. Typically each node comprises a Network Element consisting of a multiplexer/demultiplexer which is provided for routing traffic and other signals to other switching elements through further inputs and outputs which are not shown in FIG. 1 for reasons of clarity and simplicity. Since SDH is a synchronized network it is important that a high quality timing signal is available to all nodes within the network. As shown an external timing source 6 is input to the first node 1 within the network. As shown the external timing source is denoted by G811 which to use SDH terminology implies that the source is of the highest quality. This signal is then distributed along the data link 5 in such a way that there are no closed timing loops provided—i.e. each channel 5A or 5B is timed from a source which has at most only been looped back on itself once. If one of these sections fails as a timing source, as is illustrated in FIG. 2 at point x, a timing loop is created since channel 5B will obtain timing information from the channel available to it—i.e. that incoming on channel 5A from node 4. This causes a synchronization status indication to be inserted as part of a multiplex section overhead signal in the S1 part of the section overhead. It should be appreciated that the detection of "looped" timing is not as easy to detect as the illustration indicates. For each node may be connected by multiple sections and hence the timing loop would possibly occur if timing from one of these sources were to be turned round on the same node but in a different section as is illustrated in FIG. 3.

The examples shown in FIGS. 1, 2 and 3 imply a very simple set of East/West directions to determine where the timing signal is looped back. When used with cross connect devices or elements residing in a meshed network, the determination of where the timing is turned around back towards the source from where it originated is less certain and thus a certain degree of network knowledge regarding its immediate surroundings must be imparted to the respective node.

According to the invention, in one aspect, each node is operative to append identifying data to a signal associated with the clock signal, such as the SSMB as in the SDH hierarchy.

The S1 byte contains four spare bits (1–4) and it is these that are used. The identifier necessitates a relatively large range and sixteen bits are allocated and multiframed as shown below;

| S1 Bit | Bit 1 | Bit 2 | Bit 3 | Bit 4 |
|---|---|---|---|---|
| Frame 1 | 1 (FAW) | B0 | B1 | Spare |
| Frame 2 | 0 | B2 | B3 | Spare |
| Frame 3 | 0 | B4 | B5 | Spare |
| Frame 4 | 0 | B6 | B7 | Spare |
| Frame 5 | 0 | B8 | B9 | Spare |
| Frame 6 | 0 | B10 | B11 | Spare |
| Frame 7 | 0 | B12 | B12 | Spare |
| Frame 8 | 0 | B14 | B15 | Spare |

FAW relates to the frame alignment word. FIG. 4 shows the case where two nodes 10, 11 are connected by two separate bidirectional channels 5. A synchronization source 6 of quality level G.811 is used to time each of the traffic bearing sections from the first node 10 to the second node 11. The SSMB attached to each of the sections indicates that the quality level is G811 and the source identifier is set to indicate that it is originated from the first node 10. The second node 11 uses the recovered clock signal from one of these sections to synchronize the traffic transmitted back to the first node 10. However the SSMB in this case is set to "do not use" as the node is able to ascertain that both channels $5A_1$ $5B_1$ are connected to the first node 10 and hence the timing would be turned around. The S1 byte is set to "1111" to indicate the "do not use" signal.

FIG. 5 illustrates a more complicated network where each node 21, 22, 23, 24 is connected by two bi-directional sections $5_1 5_2$ with two spurs at the third node 23 connected to two further nodes 24 and 25. In each case where timing has been looped a "do not use" indication is transmitted in the SSMB. Each node is able to determine from which other node in the network timing has been received from and is then able to determine whether the timing signal has been turned around.

As described above the arrangement removes the need for network knowledge to be downloaded from the controlling management centre to indicate potential timing loops. Furthermore network changes need little or no reconfiguration with respect to the timing data. The system may also have increased reliability since configuration is reduced to simply providing a synchronization source identifier or node identifier for each element in the network and accordingly the chances of incorrect configuration are considerably reduced.

The embodiment described above is of particular use in preventing the occurence of timings loops between adjacent nodes in a network. A second embodiment of the invention will now be described which allows multimode timing loops to be identified and can also provide a means of identifying through how many nodes a timing signal has passed. This can be important because deterioration occurs in the clock signal each time it is used for synchronization purposes. For example, SDH standards currently specify that no more than twenty synchronized clocks should form part of a so called synchronized reference chain due to the deterioration of timing quality. In the second embodiment node identification information is added to a list each time the clock signal passes through a respective node. The identity information is appended to the SSMB, as is described below. As has been described previously the S1 byte contains four spare bits (1–4). Each identifier necessitates a relatively large range and sixteen bits are allocated. A maximum of twenty identifiers are needed to form a list and an indication of the number of identifiers currently in that list is also provided. This structure is multiframed and is shown below.

| S1 Bit | Bit 1 | Bit 2 | Bit 3 | Bit 4 | |
|---|---|---|---|---|---|
| Frame 1 | 1 (FAW) | B0 | B1 | Spare } | |
| Frame 2 | 0 | B2 | B3 | Spare } | |
| Frame 3 | 0 | B4 | B5 | Spare } | Number Source IDs |
| Frame 4 | 0 | B6 | B7 | Spare } | |
| Frame 5 | 0 | B8 | B9 | Spare } | |
| Frame 6 | 0 | B10 | B11 | Spare } | |
| Frame 7 | 0 | B12 | B12 | Spare } | |
| Frame 8 | 0 | B14 | B15 | Spare } | |
| Frame 9 | 0 | B16 | B17 | Spare } | Source ID #1 |
| Frame 10 | 0 | B18 | B19 | Spare } | |
| Frame 11 | 0 | B20 | B21 | Spare } | |
| Frame 12 | 0 | B22 | B23 | Spare } | |
| Frame 13 | 0 | B24 | B25 | Spare } | |
| Frame 158 | 0 | B314 | B315 | Spare } | |
| Frame 159 | 0 | B316 | B317 | Spare } | |
| Frame 160 | 0 | B318 | B319 | Spare } | |
| Frame 161 | 0 | B320 | B321 | Spare } | Source ID #20 |
| Frame 162 | 0 | B322 | B323 | Spare } | |
| Frame 163 | 0 | B324 | B325 | Spare } | |
| Frame 164 | 0 | B326 | B327 | Spare } | |
| Frame 165 | 0 | B328 | B329 | Spare } | |

Each time a synchronization source is used by a node its identification data is appended to the list of nodes held in the SSMB and the number of source ID's is incremented by one. This new SSMB is then transmitted in each section that uses that source for timing.

FIG. 6 corresponds to FIG. 5 except that the alternative technique is used. Each node is able to detect potential timing loops if its own identification data is present in the received SSMB. For example, the third node 23 knows that it cannot use timing from nodes 25 and 26 as its own identification information is present in the SSMB received from those nodes. Each node is also able to determine the length of the synchronization reference chain and as such is able to determine whether the quality of timing has deteriorated beyond the point that it should be used. For example if a chain length of five were to be considered unacceptable, then the timing from the sixth node 26 could indicate in its SSMB a quality of "do not use".

What is claimed is:

1. A synchronous digital hierarchy (SDH) network, comprising: a plurality of nodes interconnected by bi-directional links, an external clock signal being present at an input of one of said nodes, said nodes being arranged to pass the clock signal from node to node for synchronization, each node including means for stamping the clock signal passing through the respective node with data identifying that node as part of a means for preventing the occurrence of closed timing loops.

2. The SDH network according to claim 1, in which each node includes means for replacing any node identifying data from preceding nodes through which the clock signal has passed.

3. The SDH network according to claim 2, in which each node includes means for reading the identity of the node from which an incoming clock signal has arrived and for transmitting, in the event that the clock signal is to be returned to that same node, a signal indicative that the clock signal is not to be used for synchronization.

4. The SDH network according to claim 3, in which the synchronization status indication (SSMB) is adapted to carry a signal indicative that the clock signal is not to be used.

5. The SDH network according to claim 4, in which the SSMB has an S1 byte adapted to carry the signal.

6. The SDH network according to claim 1, in which each node includes means for adding node identifying data to a list transmitted along with the clock signal, said list identifying a plurality of preceding nodes through which the clock signal has passed and means for preventing, in the event that the list contains data identifying the respective node, use by the respective node of the clock signal for synchronization.

7. The SDH network according to claim 6, in which each node includes means for counting the number of nodes through which the clock signal has passed and for preventing, in the event that the number exceeds a predetermined value, use by the respective node of the clock signal for synchronization.

8. A method of preventing the occurrence of closed timing loops within an SDH network, which network comprises a plurality of nodes interconnected by bi-directional links and which are arranged to pass an external clock signal from node to node for synchronization purposes, said method comprising the step of stamping the clock signal passing through each node with data identifying that node.

* * * * *